United States Patent
Matta et al.

(10) Patent No.: US 7,679,600 B2
(45) Date of Patent: Mar. 16, 2010

(54) POINTING DEVICE WITH EXTENDED TRAVEL

(75) Inventors: Farid Matta, Los Altos, CA (US); Jonah Harley, Mountain View, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 1166 days.

(21) Appl. No.: 10/944,335

(22) Filed: Sep. 16, 2004

(65) Prior Publication Data
US 2006/0055667 A1 Mar. 16, 2006

(51) Int. Cl.
G09G 5/00 (2006.01)
(52) U.S. Cl. ........................................................ 345/156
(58) Field of Classification Search .......... 345/156–173
See application file for complete search history.

(56) References Cited

U.S. PATENT DOCUMENTS

| | | | |
|---|---|---|---|
| 5,086,296 A * | 2/1992 | Clark | 345/157 |
| 5,111,005 A | 5/1992 | Smith et al. | |
| 5,121,275 A * | 6/1992 | Komiyama | 360/132 |
| 5,479,191 A | 12/1995 | Komatsu | |
| 6,266,046 B1 | 7/2001 | Arita | |
| 6,839,050 B2 * | 1/2005 | Sakamaki et al. | 345/156 |
| 7,158,115 B2 * | 1/2007 | Harley et al. | 345/157 |
| 2001/0007449 A1 * | 7/2001 | Kobachi et al. | 345/156 |
| 2004/0135767 A1 * | 7/2004 | Park | 345/156 |
| 2004/0178989 A1 * | 9/2004 | Shahoian et al. | 345/156 |
| 2006/0022937 A1 * | 2/2006 | Matta et al. | 345/156 |

FOREIGN PATENT DOCUMENTS

GB 2 247 938 A 3/1992

* cited by examiner

*Primary Examiner*—Amr Awad
*Assistant Examiner*—Waseem Moorad

(57) ABSTRACT

A pointing device having a moveable puck that moves in a predetermined field of motion by applying a lateral force thereto is disclosed. A first linear spring is attached to the puck, the first spring applying a first force to the puck at each location in the field of motion. A second linear spring is also attached to the puck, the second spring applying a second force to the puck at each location in the field of motion. The first and second springs return the puck to a predetermined location in the field of motion when the lateral force is not applied to the puck. The first linear spring is folded around a bending point and attached to a portion of the pointing device that is stationary with respect to the puck.

10 Claims, 4 Drawing Sheets

POINTING DEVICE WITH EXTENDED TRAVEL

BACKGROUND OF THE INVENTION

To simplify the following discussion, the present invention will be explained in terms of a pointing device for use on a computer; however, the present invention may be utilized with a wide range of data processing systems including hand held computers, cell phones, video games, and the like. Modem computer operating systems and graphics programs require a pointing device for controlling the position of a cursor on the computer display. For desktop PCs, the most successful pointing device is the "mouse". A mouse is a hand held object that is moved over a flat surface near the keyboard to control the motion of a cursor on the computer display. The direction and distance over which the mouse is moved determines the direction and distance the cursor moves on the display. A conventional mouse provides a rigid object that a user can move with great precision. For a desktop computer, the mouse provides a satisfactory solution to the pointing problem. On the occasion when the workspace is not large enough to provide a path over which the mouse can move and accommodate the desired cursor movement on the display, the user simply picks up the mouse and recenters the mouse in the workspace. Hence, the mouse can provide an almost limitless range of motion.

While the mouse has provided a satisfactory solution to the pointing device problem in the desktop PC market, a similarly successful device is not available for portable and hand-held computers. These computers are often used in environments that lack a sufficiently large flat surface near the keyboard over which a mouse can be moved. Hence, some other form of pointing device is needed when these computers are used in such environments.

A pointing device for use in these environments must solve the problem of moving a cursor quickly and accurately. In addition, the device must operate in an intuitive fashion that a novice user can comprehend without extensive instruction. Further, the pointing device must operate in a limited workspace and fit within the form factor of the computer or hand held device. Finally, the usual constraints of low cost, low power consumption and high reliability must also be met.

In previously filed U.S. patent application Ser. No. 10/722, 698, filed Nov. 24, 2003, which is hereby incorporated by reference, a pointing device that meets these requirements is described. The pointing device utilizes a puck that moves in a defined field of motion when a user applies pressure to the puck via the user's finger. When the user releases the puck, a set of springs returns the puck to its centered position within the field of motion. The position of the puck and the pressure on the puck are determined by electrodes in the device. The position information is used to position a cursor on the display screen. Software on the attached device translates the motion of the puck during the time the user's finger is pressing on the puck into the appropriate cursor motion on the device's display. When the user releases the puck, the coupling between the puck and the cursor position is broken by the software, and hence, the cursor does not move backwards while the puck is being recentered.

While the device taught in the above-described patent application provides significant advantages over the dominant prior art solutions to the pointing device problem in the laptop marketplace, there are a number of areas in which improvements would be useful. In particular, it would also be advantageous to provide embodiments in which the ratio of the field of motion to the overall dimensions of the pointing device is as close to unity as possible.

SUMMARY OF THE INVENTION

The present invention includes a pointing device having a moveable puck that moves in a predetermined field of motion by applying a lateral force thereto. A first linear spring is attached to the puck, the first spring applying a first force to the puck at each location in the field of motion. A second linear spring is also attached to the puck, the second spring applying a second force to the puck at each location in the field of motion. The second force is in opposition to the force applied to the puck by the first force, the first and second springs returning the puck to a predetermined location in the field of motion when the lateral force is not applied to the puck. The first linear spring is folded around a bending point and attached to a portion of the pointing device that is stationary with respect to the puck. In one embodiment, the first linear spring includes an elastic cord. The first linear spring can also include a transparent leader for attaching the first linear spring to the puck wherein the first linear spring is not visible when the puck is at the resting position. In one embodiment, the first linear spring has a relaxed length longer than the maximum dimension of the field of motion. In one embodiment, the minimum length of the first linear spring is greater than the difference in distance between two points in the field of motion.

DETAILED DESCRIPTION OF PREFERRED EMBODIMENTS OF THE INVENTION

Figure 1:
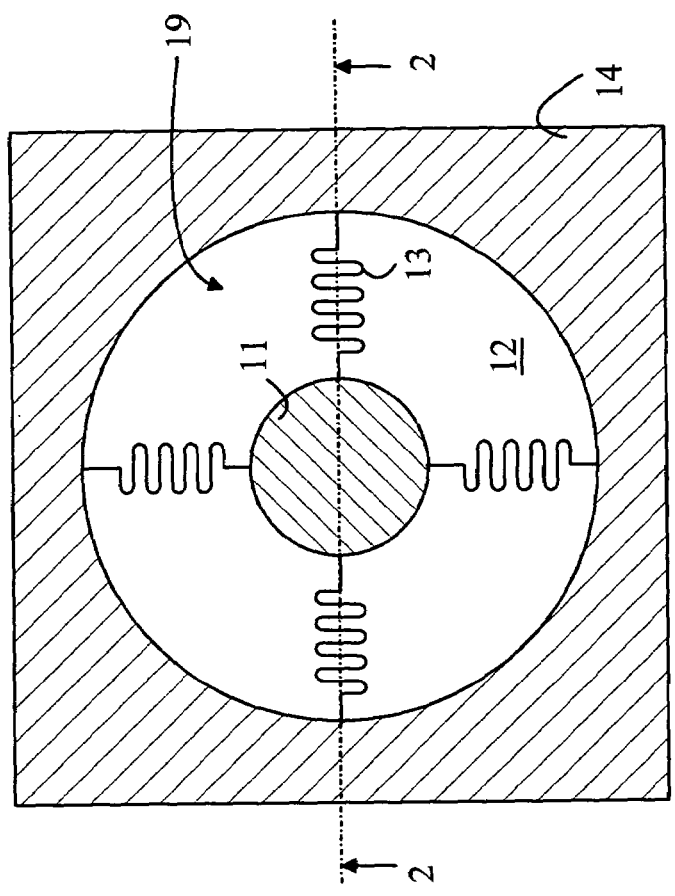
FIG. 1 is a top view of pointing device 10.
Figure 2:
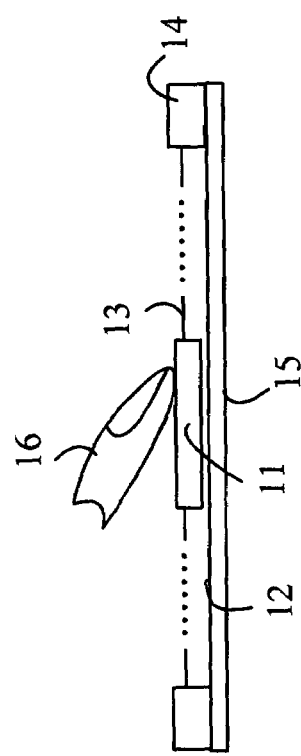
FIG. 2 is a cross-sectional view of pointing device 10 through line 2-2 shown in FIG. 1.

The manner in which the present invention provides its advantages can be more easily understood with reference to FIGS. 1 and 2, which illustrate a pointing device 10 according to one embodiment of the invention taught in the above-described patent application. FIG. 1 is a top view of pointing device 10, and FIG. 2 is a cross-sectional view of pointing device 10 through line 2-2 shown in FIG. 1. Pointing device 10 includes a puck 11 that moves over a surface 12 of a substrate 15 within a puck field of motion 19 in response to a lateral force applied to puck 11. The force is typically applied to puck 11 by a user's finger. Puck 11 includes a pressure sensing mechanism that measures the vertical pressure applied to puck 11. In addition, pointing device 10 includes a sensing mechanism for determining the position of puck 11 on surface 12.

When the user releases puck 11 by removing the user's finger 16, puck 11 is returned to its centered position by the springs shown at 13 that connect the puck to the side 14 of the puck field of motion. Since the user's finger is not applying a vertical force to puck 11 during its return, the change in position associated with that return motion is not reported to the host device. That is, the cursor remains at its previous location. This provides a convenient "re-centering" capability, typically achieved on a mouse by lifting and replacing the mouse at the center of the field of motion. Re-centering is particularly necessary in laptop computers, hand-held devices and other miniature applications in which the field of motion is constrained.

Figure 3:
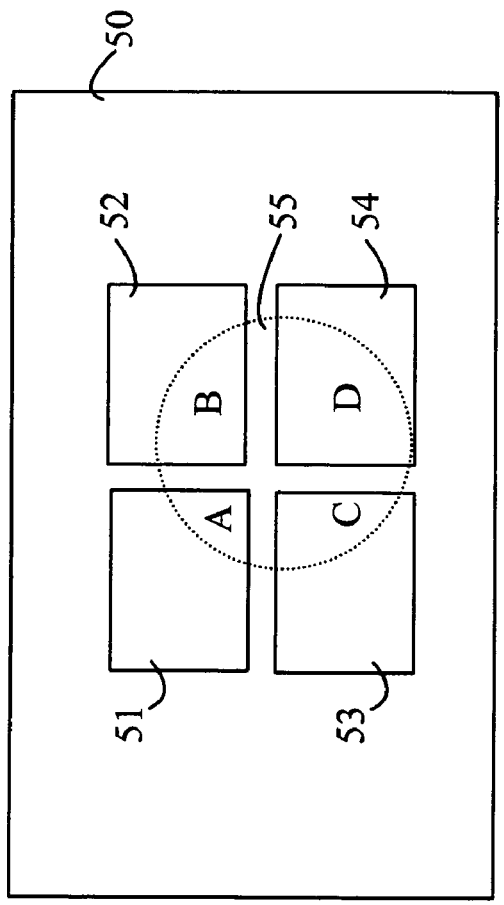
FIG. 3 is a top view of a portion of the surface shown in FIG. 1 over which the puck moves in one embodiment of the present invention.

The manner in which the position of the puck is sensed in one embodiment is described in detail in the above-identified patent application, and hence, will not be discussed in detail here. For the purposes of this discussion, it will be assumed that a capacitive sensing scheme is utilized to determine the puck's position. Such a scheme is illustrated in FIG. 3, which is a top view of a portion of surface 12 shown in FIG. 1 over which the puck moves in one embodiment of the present invention. Surface 50 includes four electrodes shown at 51-54 having terminals that are connected to an external circuit. To simplify the drawing, these terminals have been omitted. The puck has a bottom surface that includes an electrode 55 that is shown in phantom in the drawing. Electrodes 51-55 are electrically isolated from one another. For example, electrode 55 can be covered with a layer of dielectric that provides the required insulation while still allowing electrode 55 to slide over the other electrodes. The electrodes can in fact be patterned on the back of the substrate whose surface is shown at 50. This reduces the capacitance between the electrodes and the puck electrode, but can be practical for substrate thicknesses of a few millimeters or less. The overlap between electrode 55 and each of electrodes 51-54 depends on the position of the puck relative to electrodes 51-54. Denote the overlaps between electrode 55 and electrodes 51-54 by A-D, respectively.

Figure 4:
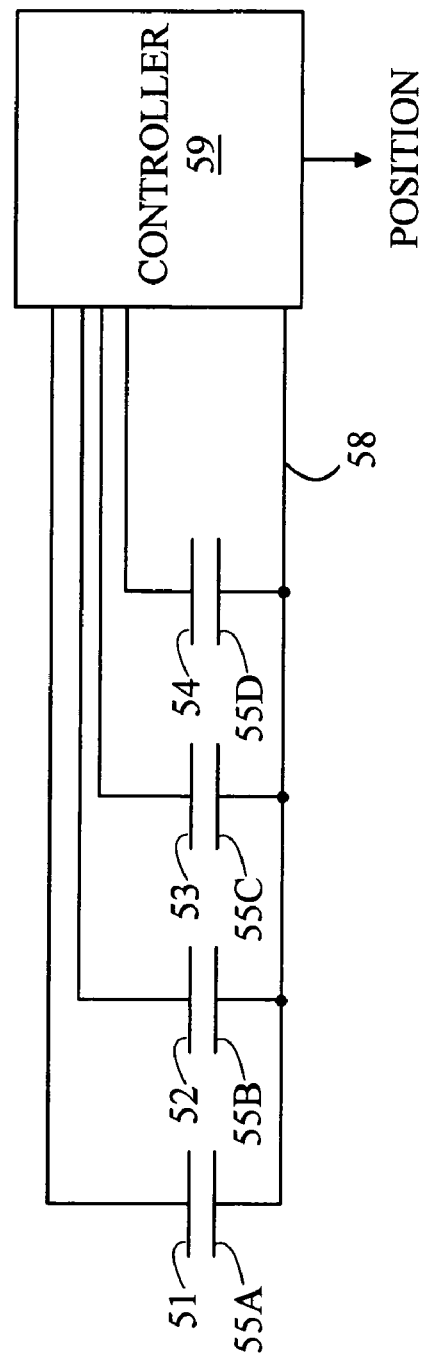
FIG. 4 is a schematic drawing of an equivalent circuit for electrodes 51-55.

Refer now to FIG. 4, which is a schematic drawing of an equivalent circuit for electrodes 51-55. The portion of electrode 55 that overlaps electrode 51 forms a parallel plate capacitor having a capacitance that is proportional to overlap A. Similarly, the portion of electrode 55 that overlaps electrode 52 forms a parallel plate capacitor that has a capacitance that is proportional to overlap B, and so on. Since all of the capacitors share portions of electrode 55, the equivalent circuit consists of four capacitors connected to a common electrode shown at 58. This electrode is just electrode 55. Hence, by measuring the capacitance between electrode 55 and each of electrodes 51-54, the position of electrode 55 relative to electrodes 51-54 can be determined. This determination can be made by a controller 59, which may be part of the pointing device or part of the host device of which the pointing device forms a part.

The above-described embodiments use meander springs to reposition the puck when the user releases the puck. Ideally, the springs used to restore the puck position provide a restoring force that recenters the puck without requiring that the user apply a force that causes the user's hand to become fatigued. In addition, the force should not vary over the puck field of motion, since such variations can interfere with the precision with which the user can position the puck. In addition, embodiments that are designed for use in laptop computers, handheld devices and other miniature applications place a premium on both the lateral size of the pointing device and the thickness of the pointing device. Hence, designs in which the springs increase the thickness or lateral dimensions of the pointing device are not preferred.

The meander springs shown in FIG. 1 prevent the puck from reaching all portions of the field of motion. This is particularly true if the puck motion is toward the attachment point of the spring on the periphery of the puck field of motion. Hence, to provide a device with a specified area in the field of motion, a somewhat larger lateral area is needed to accommodate the unusable space on the surface that is required for the springs in their compressed state. In addition, the force required for moving the puck is different for different areas of the puck field of motion, as the force varies substantially over the field of motion. Accordingly, the meander spring design shown in FIG. 1 is less than ideal.

Figure 5:
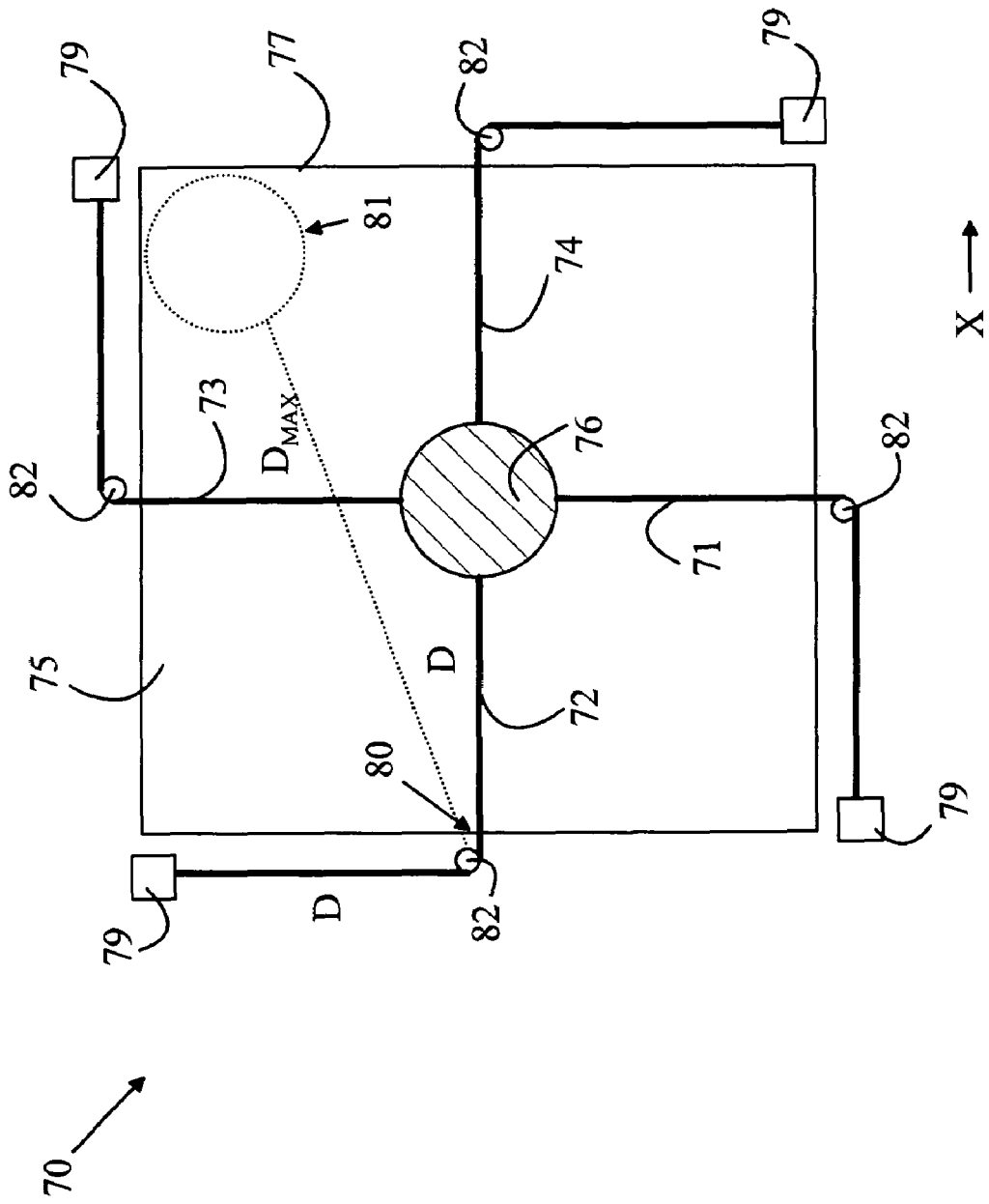
FIG. 5 is a top view of a pointer 70 according to one embodiment of the present invention.

The present invention utilizes a spring arrangement in which the puck is subjected to a restoring force that is created by opposing linear springs. Refer now to FIG. 5, which is a top view of a pointer 70 according to one embodiment of the present invention. Pointer 70 includes a puck 76 that can move in a field of motion 75 that is defined by an edge boundary 77. Puck 76 includes a pressure sensor that detects the presence of the user's finger thereon. The position of puck 76 in field of motion 75 is transmitted to the laptop computer or other device when the user pushes on puck 76. Puck 76 is attached to four linear springs shown at 71-74 that recenter puck 76 in field of motion 75 when the user releases the puck.

In this embodiment of the present invention, the linear springs, which are preferably elastic cords, are significantly longer than the distance between the equilibrium position of the puck and the edge of the field of motion. Each cord is attached to a point that is stationary with respect to the puck field of motion. In the embodiment shown in FIG. 5, the springs are attached to posts shown at 79. The lengths of the springs are chosen such that each spring applies a force to the puck when the puck is centered in the field of motion. The springs on opposite sides of the puck are tensioned such that the puck is subjected to forces that are equal but in opposite directions when centered in the field of motion. Consider the case in which puck 76 is moved in the positive X direction from its resting position in field of motion 75. Such a motion stretches spring 72 and shortens spring 74; hence, the restoring force applied by spring 72 increases, and the restoring force applied by spring 74 decreases. When the puck is released, the puck will be subjected to restoring forces that are no longer equal, and hence, the puck will be moved back to the resting position.

Mechanical springs, including the elastic cords discussed above, have a non-zero relaxed length. Mechanical springs are characterized by a ratio, R, which is the ratio of the maximum length of the spring divided by the original, relaxed length. For commercially available springs, R is typically about 2.5 or less. As a result, the length of the spring must be considerably longer than the width of the field of motion. Consider spring 72. The spring must remain taut for all positions of the puck in the field of motion. Hence, when the puck is at the position shown at 80, the length of spring 72 must be greater than, or equal to, its relaxed length to assure that it remains taut. The puck must also be able to move to position 81, and hence, the maximum length of the spring must be greater than or equal to $D_{MAX}$. If the radius of the puck is small compared to D, DMAX is approximately 2.2D, where D is the distance between the equilibrium point and point 80. Hence, the maximum length of the extended spring must be at least equal to the relaxed length plus 2.2D. For the commercially available springs discussed above, it can be shown that the relaxed length must be greater than about D. Accordingly, the spring length will vary from D to 3.2D as the puck moves from point 80 to point 81.

The area required for the pointing device is the area of the field of motion plus the area needed to hold the springs in their relaxed state. Hence, if the springs were to be mounted in an arrangement in which the spring had to remain straight, the dimensions of the pointing device would be increased by 2D.

In essence, only half of the area would be useable. The present invention utilizes a flexible spring that can be folded around a post such as the bending posts shown at 82 to avoid the need for extending the end of the spring beyond the field of motion.

The embodiment discussed above utilizes springs constructed from elastic cords. However, other forms of flexible springs can be utilized provided the spring can be folded around a post or similar object and still function. For example, a flexible coiled spring could, in principle, be utilized. However, such springs typically have large cross-sections, and hence, would increase the thickness of the pointing device. For many applications such as laptop computers and handheld devices, there are severe constraints on the thickness of the overall device, and hence, such springs are often not practical. Polymeric elastic cords, in contrast, are available in diameters of less than 1 mm, and hence, do not contribute to the overall thickness of the pointing device.

Figure 6:
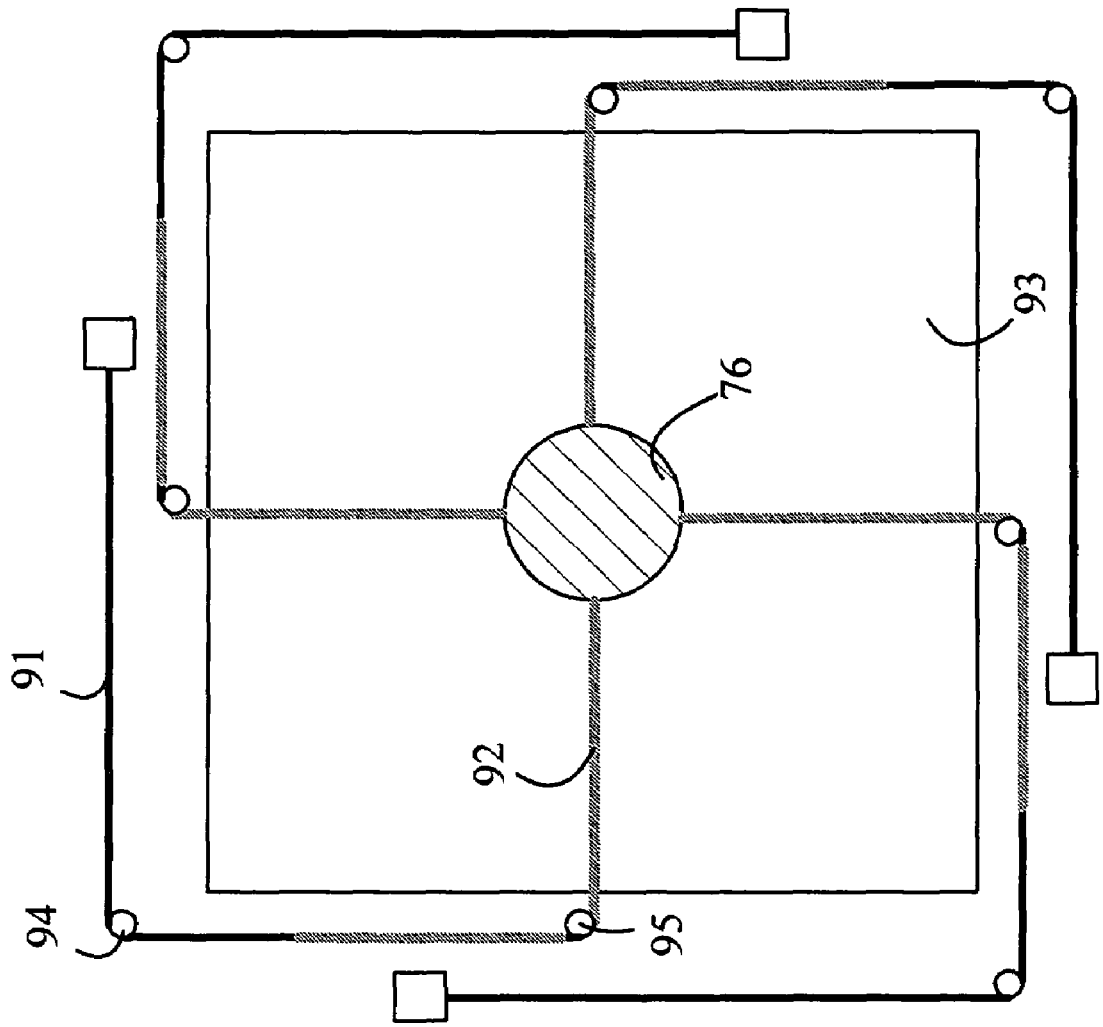
FIG. 6 is a top view of a pointer 90 utilizing a clear leader to attach the puck to the spring.

In some applications, the visibility of the elastic cord in the field of motion may be esthetically objectionable. For example, many of the potential cords are constructed from materials that are opaque, and hence, are easily visible. This problem can be reduced by utilizing a clear leader to connect the puck to the elastic cord of the spring. Such an arrangement is shown in FIG. 6, which is a top view of a pointer 90 utilizing a clear leader to attach the puck to the spring. The elastic cord is shown at 91, and the leader is shown at 92. The leader must be at least 2D long to prevent the cord itself from being visible in the field of view 93. In such an arrangement, the effective minimum length of the spring system is increased by the addition of the leader, and hence, the spring and leader can be folded by passing over two or more posts such as bending posts 94 and 95. While the portions of the spring system that are outside of the field of motion are shown in FIG. 6 for clarity, it is to be understood that these portions would normally be placed under a cover and hence hidden.

In the above-described embodiments, the elastic springs are folded by bending the springs around posts. However, arrangements in which a small pulley is used to facilitate the motion of the spring around the post can also be constructed.

The above-described embodiments of the present invention utilize 4 linear springs to restore the puck to its resting position when the puck is released. However, embodiments with a different number of springs can be utilized. The minimum number of springs is two. For example, an embodiment that is similar to pointing device 70 shown in FIG. 5 can be constructed by omitting springs 71 and 73.

Various modifications to the present invention will become apparent to those skilled in the art from the foregoing description and accompanying drawings. Accordingly, the present invention is to be limited solely by the scope of the following claims.

What is claimed is:

1. A pointing device comprising:
a moveable puck that can be positioned at any location in a predetermined field of motion by applying a lateral force thereto;
a first linear spring attached to said puck, said first spring applying a first force to said puck at each location in said field of motion;
a second linear spring attached to said puck, said second spring applying a force component to said puck at each location in said field of motion, and
a bending post in a stationary position with respect to said puck, wherein the bending post is located outside of said field of motion, said bending post to contact an intermediate portion of said first linear spring to bend said first linear spring in a folded configuration at approximately a 90 degree angle around the bending post when the puck is in a resting position, wherein a first end of said first linear spring is attached to a stationary point located outside said field of motion such that a portion of the spring substantially follows a path adjacent to a perimeter of said field of motion of said puck, wherein said bending post further maintains a consistent location of a bending point for all positions of said puck within said field of motion.

2. The pointing device of claim 1 wherein said first linear spring comprises an elastic cord.

3. The pointing device of claim 1 wherein said first linear spring comprises a transparent leader for attaching said first linear spring to said puck, said first linear spring is not visible in said field of motion when said puck is at said resting location.

4. The pointing device of claim 1 wherein said field of motion is characterized by a maximum distance through which said puck moves in traversing two locations in said field of motion and wherein said first linear spring has a relaxed length longer than said maximum distance.

5. The pointing device of claim 1 wherein said bending post comprises a pulley.

6. A method inputting a location comprising:
positioning a moveable puck within a predetermined field of motion by applying a lateral force thereto, said field of motion being characterized by maximum dimension through which said puck can move in traversing two positions in said field of motion;
providing a first linear spring attached to said puck, said first spring applying a first force a said puck at each location in said field of motion;
providing a second linear spring attached to said puck, said second spring applying a second force to said puck at each location in said field of motion, said first and second springs returning said puck to a predetermined location in said field of motion when said lateral force is not applied to said puck; and
providing a bending post in a stationary position with respect to said puck, wherein the bending post is located outside of said field of motion, said bending post to contact an intermediate portion of said first linear spring to bend said first linear spring in a folded configuration at approximately a 90 degree angle around the bending post when the puck is in a resting position, wherein a first end of said first linear spring is attached to a stationary point located outside said field of motion such that a portion of the spring substantially follows a path adjacent to a perimeter of said field of motion of said puck, wherein said bending post further maintains a consistent location of a bending point for all positions of said puck within said field of motion.

7. The method of claim 6 wherein said first linear spring comprises an elastic cord.

8. The method of claim 6 wherein said first linear spring comprises a transparent leader for attaching said first linear spring to said puck, said transparent leader being longer than said maximum dimension.

9. The method of claim 6 wherein said first linear spring has a relaxed length longer than said maximum dimension.

10. The method of claim 6 wherein said bending post comprises a pulley.

\* \* \* \* \*